(12) United States Patent
Krick et al.

(10) Patent No.: US 11,731,391 B2
(45) Date of Patent: Aug. 22, 2023

(54) FIRE RESISTANT LOW DENSITY ACOUSTIC PANEL

(71) Applicant: ARMSTRONG WORLD INDUSTRIES, INC., Lancaster, PA (US)

(72) Inventors: Charles G. Krick, Lititz, PA (US); Marie A. DePaul, West Chester, PA (US)

(73) Assignee: AWI LICENSING LLC, Wilmington, DE (US)

( * ) Notice: Subject to any disclaimer, the term of this patent is extended or adjusted under 35 U.S.C. 154(b) by 558 days.

(21) Appl. No.: 16/882,921

(22) Filed: May 26, 2020

(65) Prior Publication Data

US 2020/0370294 A1    Nov. 26, 2020

Related U.S. Application Data

(60) Provisional application No. 62/852,059, filed on May 23, 2019.

(51) Int. Cl.
*B32B 5/10* (2006.01)
*E04B 1/84* (2006.01)
(Continued)

(52) U.S. Cl.
CPC ............... *B32B 5/10* (2013.01); *B32B 5/273* (2021.05); *D04H 1/43828* (2020.05); *D04H 1/44* (2013.01); *D04H 1/732* (2013.01); *E04B 1/8409* (2013.01); *B32B 2262/0276* (2013.01); *B32B 2307/102* (2013.01); *B32B 2607/00* (2013.01);
(Continued)

(58) Field of Classification Search
CPC ... B32B 5/10; B32B 5/273; B32B 2262/0276; B32B 2307/102; B32B 2607/00; D04H 1/43828; D04H 1/44; D04H 1/732; D04H 1/435; E04B 1/8409; E04B 2001/8281; E04B 2001/8461
See application file for complete search history.

(56) References Cited

U.S. PATENT DOCUMENTS 5,149,920 A    9/1992   Meeker et al.
RE36,232 E    10/1999   Thompson et al.
(Continued)

FOREIGN PATENT DOCUMENTS

EP         130511 A2      4/2003
KR     10-1843046 B1      5/2018
(Continued)

OTHER PUBLICATIONS

International Search Report for related patent PCT/US2020/034482 dated Sep. 30, 2020.

*Primary Examiner* — Forrest M Phillips
(74) *Attorney, Agent, or Firm* — Patrick Sheldrake

(57) ABSTRACT

Described herein is an acoustic building panel comprising: a body comprising a fibrous material and having a first major surface opposite a second major surface and a side surface extending there-between, the fibrous material comprising polyester fiber in an amount of at least 70 wt. % based on the total weight of the fibrous material; wherein the body has a bulk density as measured between the first major surface, the second major surface, and the side surface, the bulk density ranging from about 4.8 lb./ft³ to about 6.0 lb./ft³.

20 Claims, 8 Drawing Sheets

(51) Int. Cl.
  *D04H 1/44* (2006.01)
  *D04H 1/732* (2012.01)
  *D04H 1/4382* (2012.01)
  *B32B 5/26* (2006.01)
  *D04H 1/435* (2012.01)
  *E04B 1/82* (2006.01)

(52) U.S. Cl.
  CPC ...... *D04H 1/435* (2013.01); *E04B 2001/8281* (2013.01); *E04B 2001/8461* (2013.01)

(56) References Cited

U.S. PATENT DOCUMENTS

| | | | |
|---|---|---|---|
| 6,443,257 B1 | 9/2002 | Wiker et al. | |
| 7,565,951 B1 * | 7/2009 | Perdue | E04B 1/86 181/295 |
| 7,918,313 B2 | 4/2011 | Gross et al. | |
| 11,060,675 B2 * | 7/2021 | Laluet | G10K 11/162 |
| 11,468,872 B2 * | 10/2022 | Perdue | E04B 1/86 |
| 2003/0134556 A1 | 7/2003 | Christie et al. | |
| 2004/0065507 A1 | 4/2004 | Jacobsen | |
| 2005/0142335 A1 * | 6/2005 | Berdan | A47B 81/06 428/192 |
| 2008/0190060 A1 | 8/2008 | Pinto | |
| 2008/0264721 A1 | 10/2008 | Tinianov et al. | |
| 2010/0320029 A1 | 12/2010 | Cao et al. | |
| 2011/0167999 A1 | 7/2011 | Dellinger et al. | |
| 2015/0232044 A1 * | 8/2015 | Demo | B60R 13/08 181/290 |
| 2022/0340486 A1 * | 10/2022 | Hargis | C04B 22/124 |

FOREIGN PATENT DOCUMENTS

| | | |
|---|---|---|
| WO | WO 2008/039240 A1 | 4/2008 |
| WO | WO 2008/050994 A1 | 5/2008 |
| WO | WO 2010/148416 A2 | 12/2010 |

* cited by examiner

FIRE RESISTANT LOW DENSITY ACOUSTIC PANEL

CROSS-REFERENCE TO RELATED APPLICATIONS

This application claims the benefit of U.S. Provisional Application No. 62/852,059, filed on May 23, 2019. The disclosure of the above application is incorporated herein by reference.

BACKGROUND

Building panels—specifically ceiling panels—are required to meet strict safety standards to ensure proper resistance to flame and smoke formation during a fire. Meeting such safety requirements often creates setbacks in achieving the desired aesthetic and/or structure properties for that panel. Thus, a need exists for building panel that can not only exhibit improved resistance to flame and smoke formation, but also exhibit the desired aesthetic and structural properties.

BRIEF SUMMARY

In some embodiments, the present invention is directed to an acoustic building panel comprising: a body comprising a fibrous material and having a first major surface opposite a second major surface and a side surface extending therebetween, the fibrous material comprising polyester fiber in an amount of at least 70 wt. % based on the total weight of the fibrous material; wherein the body has a bulk density as measured between the first major surface, the second major surface, and the side surface, the bulk density ranging from about 76.9 kg/m$^3$ to about 96.1 kg/m$^3$.

Other embodiments of the present invention include an acoustic building panel comprising a body formed of a fibrous material comprising: a first major surface; a second major surface opposite the first major surface; a side surface extending between the first major surface and the second major surface, the side surface further comprising: a first side surface; a second side surface opposite the first side surface; a third side surface; and a fourth side surface opposite the third side surface; the first and second side surfaces intersecting the third and fourth side surfaces; wherein the body has a thickness as measured between the first and second major surfaces, a length as measured between the first and second side surface, and a width as measured between the third and fourth side surfaces wherein a first ratio of length to thickness is at least 40:1 and a second ratio of width to thickness is at least 40:1; wherein the body having a bulk density as measured between the first major surface, the second major surface, and the side surface, the bulk density ranging from about 76.9 kg/m$^3$ to about 96.1 kg/m$^3$.

Other embodiments of the present invention include a ceiling system comprising: a support element having a downward facing support surface; at least one of the previously mentioned acoustic building panels; wherein the acoustic building panels are coupled to the support element such that the first major surface of the body contacts the downward facing support surface.

Other embodiments of the present invention include a method of forming an acoustic building panel, the method comprising: a) creating a blend comprising a fibrous material and mixing the blend with pressurized air in a mixing apparatus, the blend being transported along a machine direction as it is mixed; b) depositing the blend onto a conveyor to form a continuous web having a first thickness; c) passing the continuous web between a compression element along the machine direction, the compression element compressing the continuous web to a second thickness that is less than the first thickness; wherein the fibrous material of the blend comprises at least 70 wt. % of polyester fiber based on the total weight of the fibrous material, and the continuous web having the second thickness has a bulk density ranging from about 76.9 kg/m$^3$ to about 96.1 kg/m$^3$.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
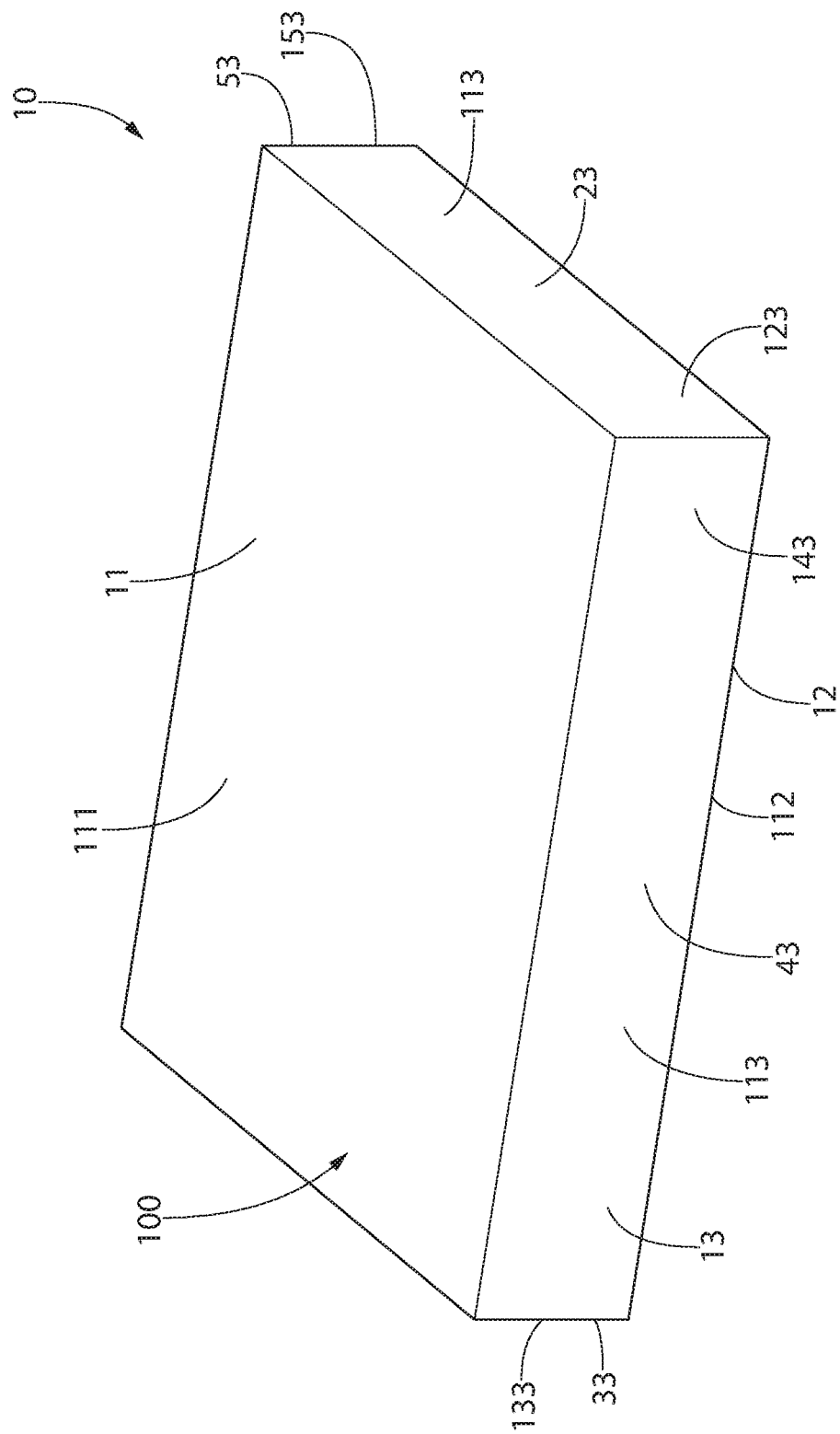
FIG. 1 is a perspective view of an acoustic building panel according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom"

as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means+/−5% of the reference value. According to the present application, the term "substantially free" less than about 0.1 wt. % based on the total of the referenced value.

Figure 4:
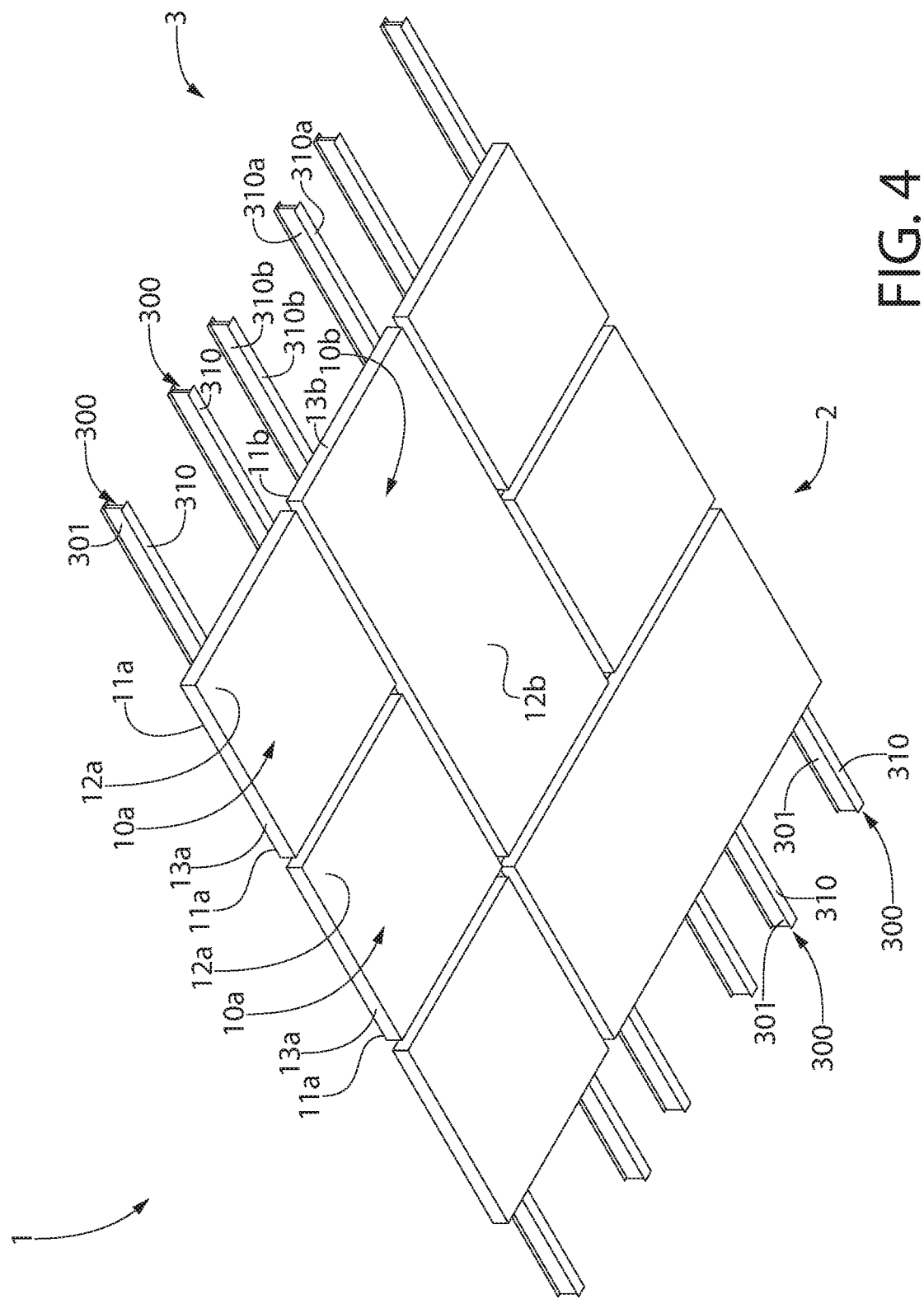
FIG. 4 is a upward facing perspective view of building system comprising the a plurality of the building panels of the present invention.

Referring to FIGS. 1 and 4, the present invention is directed to a building panel 10 and a building system 1 comprising at least one of the building panels 10. In some embodiments of the present invention, the building system 1 may be a ceiling system 1—therefore, the term "ceiling system" may be used throughout, but the present invention is not limited to ceiling applications. Rather, the subsequent discussion may also apply to other building systems, such as wall systems, interior decorative systems, and the like. Similarly, the term "ceiling panel" 10 may be used interchangeably with the term "building panel," however, the present invention is not limited to ceiling panels. Rather the subsequent discussion may, for example, also apply to wall panels.

As discussed in greater detail herein, the ceiling panel 10 of the present invention may be an acoustic ceiling panel 10. As discussed in greater detail herein, the ceiling panel 10 of the present invention may be flame resistant ceiling panel 10. The ceiling panel 10 of the present invention may be a flame resistant acoustic ceiling panel 10.

Figure 2:
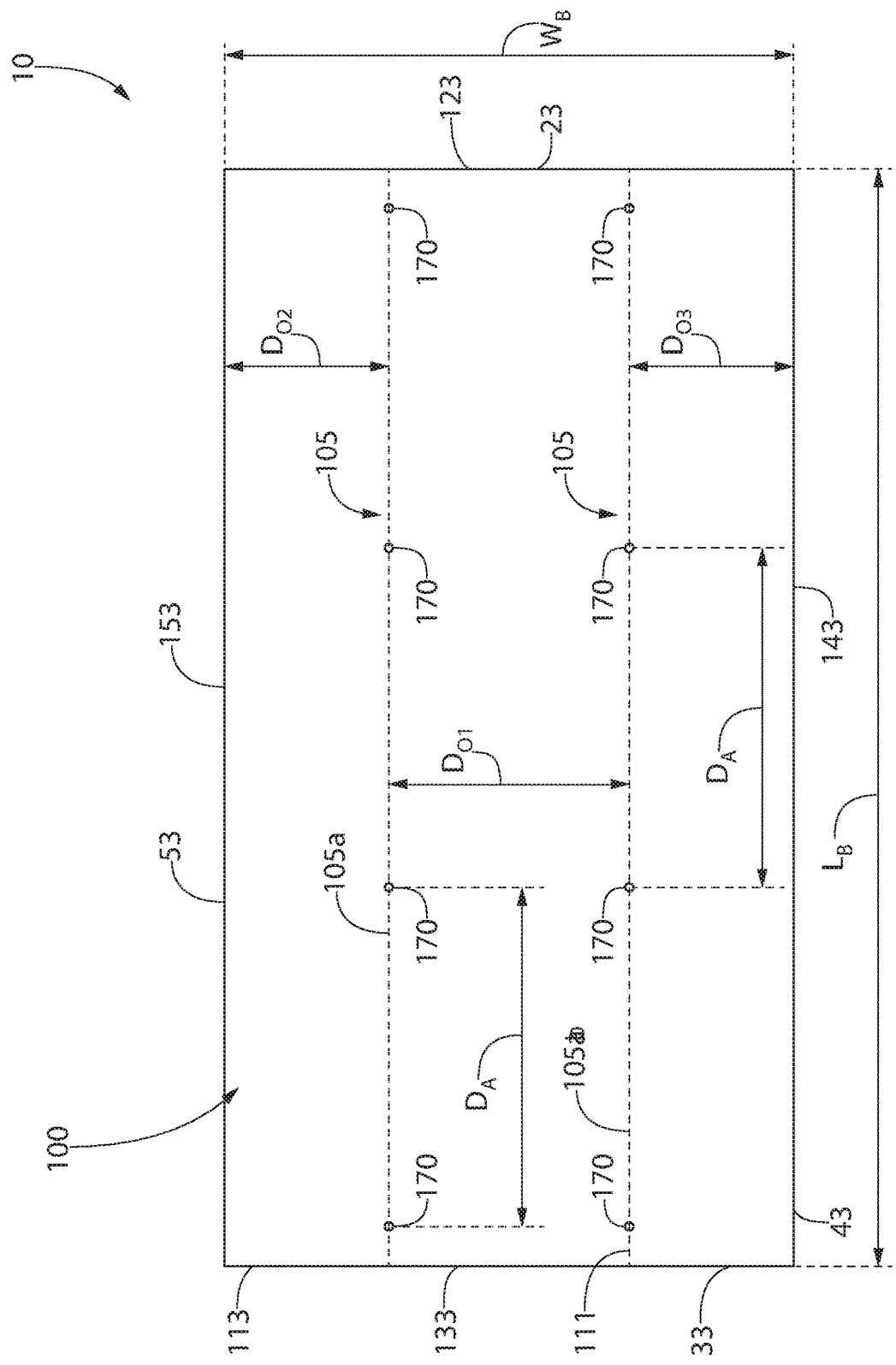
FIG. 2 is a top view of the acoustic building panel of FIG. 1.
Figure 3:
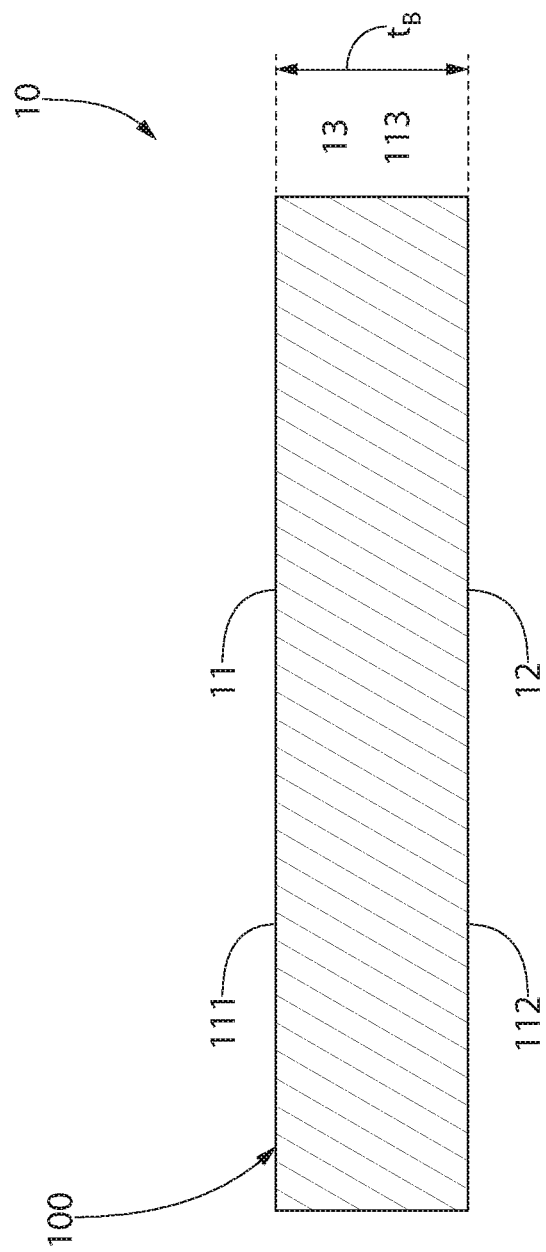
FIG. 3 is a cross-sectional view of the acoustic building panel of FIG. 1 along lines V-V.

Referring now to FIGS. 1-3, the ceiling panel 10 may comprise a first exposed major surface 11 that is opposite a second exposed major surface 12. The ceiling panel 10 may comprise an exposed side surface 13 that extends between the first and second exposed major surfaces 11, 12. The ceiling panel 10 may have a panel thickness as measured by the distance between the first major exposed surface 11 and the second major exposed surface 12.

The exposed side surface 13 of the ceiling panel 10 may comprise a first exposed side surface 23 that is opposite a second exposed side surface 33 as well as a third exposed side surface 43 that is opposite a fourth exposed side surface 53. The exposed side surface 13 may form a perimeter of the ceiling panel 10.

In some embodiments, the first and second exposed side surfaces 23, 33 may be parallel to each other. In some embodiments, the third and fourth exposed side surfaces 43, 53 may be parallel to each other. In some embodiments, the first and second exposed side surfaces 23, 33 may intersect the third and fourth exposed side surfaces 43, 53. In some embodiments, the first and second exposed side surfaces 23, 33 may be perpendicular to the third and fourth exposed side surfaces 43, 53.

The ceiling panel 10 may comprise a body 100. The body 100 may comprise a first major surface 111 that is opposite a second major surface 112. The body 100 may comprise a side surface 113 that extends between the first and second major surfaces 111, 112 of the body 100. The side surface 113 may form a perimeter of the body 100. The side surface 113 of the body 100 may comprise a first side surface 123 that is opposite a second side surface 133 as well as a third side surface 143 that is opposite a fourth side surface 153.

In some embodiments, the first and second side surfaces 123, 133 may be parallel to each other. In some embodiments, the third and fourth side surfaces 143, 153 may be parallel to each other. In some embodiments, the first and second side surfaces 123, 133 may intersect the third and fourth side surfaces 143, 153. In some embodiments, the first and second side surfaces 123, 133 may be perpendicular to the third and fourth side surfaces 143, 153.

The body 100 may have a body length $L_B$ as measured by the distance spanning between the first side surface 123 and the second side surface 133. The body length $L_B$ may range from about 60 cm to about 310 cm—including all lengths and sub-ranges there-between. In some embodiments, the body length $L_B$ may range from about 75 cm to about 250 cm—including all lengths and sub-ranges there-between. In some embodiments, the body length $L_B$ may range from about 104 cm to about 230 cm—including all lengths and sub-ranges there-between. In some embodiments, the body length $L_B$ may range from about 104 cm to about 110 cm—including all lengths and sub-ranges there-between. In some embodiments, the body length $L_B$ may range from about 210 cm to about 230 cm—including all lengths and sub-ranges there-between.

The body 100 may have a body width $W_B$ as measured by the distance spanning between the third side surface 143 and the fourth side surface 153. The body width $W_B$ may range from about 60 cm to about 130 cm—including all widths and sub-ranges there-between. In some embodiments, the body width $W_B$ may range from about 75 cm to about 130 cm—including all widths and sub-ranges there-between. In some embodiments, the body width $W_B$ may range from about 100 cm to about 120 cm—including all lengths and sub-ranges there-between.

The body 100 may have a body thickness $t_B$ as measured by the distance spanning between the first major surface 111 and the second major surface 112. The body thickness $t_B$ may range from about 18 mm to about 27 mm—including all thicknesses and sub-ranges there-between. In some embodiments, the body thickness $t_B$ may range from about 19 mm to about 26 mm—including all lengths and sub-ranges there-between. In some embodiments, the body thickness $t_B$ may range from about 22 mm to about 25 mm—including all lengths and sub-ranges there-between. In some embodiments, the body thickness $t_B$ may be about 25.4 mm.

According to the present invention, a ratio of the body length $L_B$ to the body thickness $t_B$ may be at least 24:1. According to the present invention, a ratio of the body length $L_B$ to the body thickness $t_B$ may be at least 35:1. In some embodiments, the ratio of the body length $L_B$ to the body thickness $t_B$ may be at least 40:1. In some embodiments, the ratio of the body length $L_B$ to the body thickness $t_B$ may be at least 80:1.

In some embodiments of the present invention, the ratio of the body length $L_B$ to the body thickness $t_B$ may range from about 35:1 to about 172:1—including all ratios and sub-ranged there-between. In some embodiments of the present invention, the ratio of the body length $L_B$ to the body thickness $t_B$ may range from about 35:1 to about 133:1—including all ratios and sub-ranged there-between. In some embodiments of the present invention, the ratio of the body length $L_B$ to the body thickness $t_B$ may range from about 40:1 to about 120:1—including all ratios and sub-ranges there-between. In some embodiments of the present invention, the ratio of the body length $L_B$ to the body thickness $t_B$ may range from about 40:1 to about 50:1—including all ratios and sub-ranged there-between. In some embodiments of the present invention, the ratio of the body length $L_B$ to the body thickness $t_B$ may range from about 85:1 to about 95:1—including all ratios and sub-ranged there-between.

According to the present invention, a ratio of the body width $W_B$ to the body thickness $t_B$ may be at least 24:1. In some embodiments, the ratio of the body width $W_B$ to the body thickness $t_B$ may be at least 30:1. In some embodiments, the ratio of the body width $W_B$ to the body thickness $t_B$ may be at least 35:1. In some embodiments, the ratio of the body width $W_B$ to the body thickness $t_B$ may be at least 40:1. In some embodiments of the present invention, the ratio of the body width $W_B$ to the body thickness $t_B$ may range from about 35:1 to about 50:1—including all ratios and sub-ranges there-between. In some embodiments of the present invention, the ratio of the body width $L_B$ to the body thickness $t_B$ may range from about 40:1 to about 45:1—including all ratios and sub-ranged there-between.

The first major exposed surface 11 of the ceiling panel 100 may comprise the first major surface 111 of the body 100. The second major exposed surface 12 of the ceiling panel 10 may comprise the second major surface 112 of the body 100. According to the embodiments where the first major exposed surface 11 of the ceiling panel 10 comprises the first major surface 111 of the body 100 and the second major exposed surface 12 of the ceiling panel 10 comprises the second major surface 112 of the body 100, the panel thickness may be substantially equal to the body thickness $t_B$.

In some embodiments, the ceiling panel 10 may further comprise a scrim. The scrim or facing sheet may be formed of a non-woven material. In a non-limiting example, the non-woven material may be fiberglass. The scrim may have a scrim thickness ranging from about 0.2 mm to about 0.4 mm—including all thickness and sub-ranges there-between. The scrim may be coupled to the second major surface 112 of the body 100. The scrim may be coupled by adhesive, fastener, and the like.

According to the embodiments where the ceiling panel 10 comprises a scrim coupled to the second major surface 112 of the body 100 and the first major exposed surface 11 of the ceiling panel 10 comprises the first major surface 111 of the body 100, the panel thickness may be substantially equal to the summation of the body thickness $t_B$ and the scrim thickness. In such embodiments, the first major exposed surface 11 of the ceiling panel 10 may be formed by the scrim. Stated otherwise, the first major exposed surface 11 of the ceiling panel 10 may comprise the scrim.

The body 100 may be formed of a fibrous material. The fibrous material may be present in the body 100 an amount ranging from about 90.0 wt. % to about 99.9 wt. % based on the total weight of the body 100—including all weight percentages and sub-ranges there-between. In a preferred embodiment, the fibrous material may be present in the body 100 an amount ranging from about 95.0 wt. % to about 99.9 wt. % based on the total weight of the body 100—including all weight percentages and sub-ranges there-between.

The fibrous material may comprise a plurality of fibers having an average fiber length ranging from about 25 mm to about 100 mm—including all fiber lengths and sub-ranges there-between. The fibrous material may comprise a plurality of fibers having an average fiber diameter ranging from about 4 denier to about 15 denier—including all fiber diameters and sub-ranges there-between. A denier is a unit of measure within the fiber arts that equates to one gram of mass per 9,000 meters of length.

The fibrous material may comprise a plurality of fibers having a substantially straight geometry, whereby the fibers extend substantially straight. In some embodiments, the fibrous material may comprise a plurality of fibers having a crimped geometry, whereby the fibers have a planar zig-zag and/or spiral shape. In some embodiment, the fibers may comprise a zig-zag shape. In some embodiments, the fibers may have a spiral shape.

The fibrous material may comprise an organic fiber. The organic fiber may be a synthetic organic fiber. The organic fiber may be present in an amount ranging from about 95 wt. % to about 100 wt. % based on the total weight of the fibrous material—including all weight percentages and sub-ranges there-between. In some embodiments, the organic fiber may be present in an amount of at least 99 wt. % based on the total weight of the fibrous material—including all weight percentages and sub-ranges there-between. In some embodiments, the organic fiber may be about 100 wt. % of the fibrous material.

In some embodiments, the fibrous material consists essentially of organic fiber. In some embodiments, the fibrous material consists of organic fiber. In some embodiments, the fibrous material is substantially free of inorganic fiber. In some embodiments, the body 100 is substantially free of inorganic fiber.

In some embodiments, the fibrous material consists essentially of synthetic organic fiber. In some embodiments, the fibrous material consists of synthetic organic fiber. In some embodiments, the fibrous material is substantially free of inorganic fiber. In some embodiments, the body 100 is substantially free of inorganic fiber. In some embodiments, the fibrous material is substantially free of natural organic fiber. In some embodiments, the body 100 is substantially free of natural organic fiber.

The term "natural organic fiber" may refer to naturally occurring fiber—such as, but not limited to, cellulosic fiber (also referred to as "cellulose" fiber).

The synthetic organic fiber may be a polymeric fiber. The polymeric fiber may be formed of a thermoplastic polymer. The polymeric fiber may be a polyester fiber. The polyester fiber may be formed from thermoplastic polyester. In other embodiments, the polymeric fiber may be formed by one or more thermoplastic polymers such as, but not limited to olefinic polymers, e.g., polyethylene and polypropylene; polyamide, e.g., nylon 6 and nylon 6,6; thermoplastic elastomers, e.g., SBS and ABS, and the like. In some embodiments, a portion of the polymeric fiber may be formed from thermoset polymer.

In some embodiments, the polyolefin may be from ethylene polymers, such as high-density polyethylene ("HDPE"); medium-density polyethylene ("MDPE"); low-density polyethylene ("LDPE"); and linear low-density polyethylene ("LLDPE").

The polyester fiber may be present in an amount ranging from about 95.0 wt. % to about 100 wt. % based on the total weight of the fibrous material—including all weight percentages and sub-ranges there-between. The polyester fiber may be present in an amount of at least about 70 wt. % based on the total weight of the fibrous material. In some embodiments, the polyester fiber may be present in an amount of at least about 99 wt. % based on the total weight of the fibrous material. In some embodiments, the polyester fiber may be about 100 wt. % of the fibrous material.

Non-limiting examples of polyester fiber include fibers formed of polymeric material selected from one or more of terephthalate polymers, such as polyethylene terephthalate ("PET"), polybutylene terephthalate ("PBT"), polyethylene terephthalate glycol ("PETG"), glycol-modified PBT, and the like.

The polyester polymer that forms the polyester fiber may have a glass transition temperature ranging from about 70° C. to about 85° C.—including all temperatures and sub-ranges there-between. The polyester polymer that forms the polyester fiber may have a melt temperature ranging from about 110° C. to about 295° C.—including all temperatures and sub-ranges there-between.

In some embodiments, the polyester fiber may be a single component fiber formed entirely of a single polyester polymer. In other embodiments, the polyester fiber may be a bicomponent fiber formed of two different polyester polymers (i.e., a first polyester polymer and a second polyester polymer). The first polyester may have a first melt temperature ranging from about 245° C. to about 255° C.—including all temperatures and sub-ranges there-between. The second polyester may have a second melt temperature ranging from about 255° C. to about 265° C.—including all temperatures and sub-ranges there-between. Independent of the melt temperature ranges recited above, the first melt temperature may be equal to about 90% to about 97% the second melt temperature—including all percentages and sub-ranges there-between.

The bicomponent fiber may have a side-by-side configuration or a core sheath configuration. In the core-sheath configuration, the first polyester polymer forms the core and the second polyester forms the sheath that at least partially surrounds the core. In the core-sheath configuration, the bicomponent fiber may comprise one or more fibers that is a concentric sheath-core (symmetrical core sheath) or an eccentric sheath-core (asymmetrical core-sheath).

In the bicomponent fibers, the first polyester may be present in an amount ranging from about 25 wt. % to about 75 wt. % of the bicomponent fiber and the second polyester being present in an amount ranging from about 75 wt. % to about 25 wt. %—wherein both amounts are based on the total weight of the bicomponent fiber and include all amounts and sub-ranges there-between.

The body 100 may further comprise at least one additional component selected from fire retardants, finishing oils, and/or colorants. The additional component may be present in an amount ranging from about 0.1 wt. % to about 10.0 wt. % based on the total weight of the body—including all amounts and sub-ranges there-between. In some embodiments, the additional component may be present in an amount ranging from about 0.1 wt. % to about 5.0 wt. % based on the total weight of the body—including all amounts and sub-ranges there-between.

The sum of the weight of the fibrous material and the additional component may be equal to 100 wt. % of the body 100. The body 100 may consist essentially of the fibrous material and the additional component. The body 100 may consist of the fibrous material and the additional component.

The fire retardant may be present in an amount ranging from about 0.1 wt. % to about 5.0 wt. % based on the total weight of the body 100—including all amounts and sub-ranges there-between. In some embodiments, the fire retardant may be present in an amount ranging from about 0.5 wt. % to about 4.0 wt. % based on the total weight of the body 100—including all amounts and sub-ranges there-between. Non-limiting examples of fire retardant may include non-halogenated phosphorous containing compounds, phosphine oxides, phosphinates, phosphonates, phosphates, and mixtures thereof.

The finishing oil may be present in an amount ranging from about 0.1 wt. % to about 5.0 wt. % based on the total weight of the body 100—including all amounts and sub-ranges there-between. Non-limiting examples of finishing oil may include one or more fiber lubricant compounds.

The colorant be present in an amount ranging from about 0.1 wt. % to about 2.0 wt. % based on the total weight of the body 100—including all amounts and sub-ranges there-between. Non-limiting examples of colorant may include dyes, pigments, and combinations thereof. Non-limiting examples of pigments may include titanium dioxide, carbon black, and mixtures thereof. Other non-limiting examples of colorants include 2,2-(Vinylenedi-p-phenylene) bisbenzoxazole; Copper Phthalocyanine; Diiron trioxide; 1,1'-((6-Phenyl-1,3,5-triazine-2,4-diyl)diimino)bis-9,10-anthracenedione; and combinations thereof.

The colorant may be white, black, grey, and any color within the color spectrum. According to the present invention the term "color" may include colors of the visible light spectrum (e.g., red, orange, yellow, green, cyan, blue, violet, brown, etc.) as well as white, black, and grey. In a non-limiting example, the body may be white and the colorant may be titanium dioxide. In a non-limiting example, the body may be black and the colorant may be carbon black. In a non-limiting example, the body may be white and the colorant may be grey and a blend of titanium dioxide and carbon black.

The body 100 may be porous—also referred to as a "porous body" 100. The porous body 100 may allow for air and water vapor to flow between the first major surface 111, the second major surface 112, and/or the side surface 113. The body 100 may be porous enough that it allows for enough airflow through the body 100 under atmospheric conditions for the ceiling panel 100 to function as an acoustic ceiling panel, which requires properties related to noise reduction and sound attenuation properties—as discussed further herein.

Specifically, the body 100 of the present invention may have a porosity ranging from about 90.0% to about 97.0%—including all values and sub-ranges there between. In a preferred embodiment, the body 100 has a porosity ranging from about 91% to 94%—including all values and sub-ranges there between. According to the present invention, porosity refers to the following:

$$\% \text{ Porosity} = [V_{Total} - (V_F + V_{AC})]/V_{Total}$$

Where $V_{Total}$ refers to the total volume of the body 100 defined by the first major surface 111, the second major surface 112, and the side surfaces 113. $V_F$ refers to the total volume occupied by the fibrous material in the body 100. $V_{AC}$ refers to the total volume occupied by the additional components in the body 100. Thus, the % porosity represents the amount of free volume within the body 100.

The building panel 10 of the present invention comprising the porous body 100 may exhibit sufficient airflow for the building panel 10 to have the ability to reduce the amount of reflected sound in a room. The reduction in amount of reflected sound in a room is expressed by a Noise Reduction Coefficient (NRC) rating as described in American Society for Testing and Materials (ASTM) test method C423. This rating is the average of sound absorption coefficients at four ⅓ octave bands (250, 500, 1000, and 2000 Hz), where, for example, a system having an NRC of 0.90 has about 90% of the absorbing ability of an ideal absorber. A higher NRC value indicates that the material provides better sound absorption and reduced sound reflection.

The building panel 10 of the present invention exhibits an NRC of at least about 0.5. In some embodiments, the building panel 10 of the present invention may have an NRC ranging from about 0.60 to about 1.0—including all value and sub-ranges there-between. In a preferred embodiment, the building panel 10 of the present invention may have an NRC ranging from about 0.70 to about 1.0—including all value and sub-ranges there-between.

The body 100 may also exhibit a bulk density as measured by the total weight of the body 100 divided by $V_{Total}$. The bulk density of the body 100 may range from about 72 kg/m³ to about 101 kg/m³—including all densities and sub-ranges there-between. In a preferred embodiment, the bulk density of the body 100 may range from about 77 kg/m³ to about 96 kg/m³—including all densities and sub-ranges there-between. In some embodiments, the bulk density of the body 100 may range from about 86 kg/m³ to about 96 kg/m³—including all densities and sub-ranges there-between.

It has been discovered that the body 100 of the present invention, which is formulated on the previously discussed fibrous material and additional components, results in a ceiling panel 10 that exhibits an improved resistance to fire and smoke spread. Specifically, such improvement in fire and smoke spread values are observed when the body 100 and resulting building panel 10 exhibit one or more of the previously discussed colors.

The ceiling panel 10 of the present invention may exhibit a Class A fire rating based on a flame spread value of <25 as well as a Class A rating based on a smoke developed value of <450. The ceiling panel 10 of the present invention may also exhibit a smoke developed value of less than 400.

It has also been discovered that the body 100 of the present invention, which is formulated on the previously discussed fibrous material and additional components, results in a stiffer body 100. The increase in body 100 stiffness imparts an improved sag-resistance to the resulting ceiling panel 10, thereby allowing the resulting ceiling panel 10 to be installed into the ceiling system 1 using fewer mounting hardware components, which not only decreases installation time but also creates a cost savings. Additionally, the improved body 100 stiffness allows for a greater range of dimensions for the ceiling panel 10 as the body 100 can extend greater lengths $L_B$ and/or widths $W_B$ without the ceiling panel 10 having increased susceptibility of sag in the installed state. The enhanced sag-resistance of the resulting ceiling panel 10 exists even when keeping the body 100 thickness $t_B$ between about 18 mm to about 27 mm—including all thicknesses $t_B$ and sub-ranges there-between.

The ceiling panel 10 of the present invention may be manufactured by forming the body 100 according to an airlaid process or a carding process. A scrim or other facing layer may then be coupled to the second major surface 112 of the body 100 by an adhesive or fastener. The scrim or other facing layer may then form the second exposed major surface 12 of the ceiling panel 10. According to such embodiments, the first major surface 111 of the body 100 may form the second exposed major surface 12 of the ceiling panel 10. According to such embodiments, the side surface 113 of the body 100 may form the side exposed surface 13 of the ceiling panel 10. Specifically, the first side surface 123 of the body 100 may form the first exposed side surface 23 of the ceiling panel 10; the second side surface 133 of the body 100 may form the second exposed side surface 33 of the ceiling panel 10; the third side surface 143 of the body 100 may form the third exposed side surface 43 of the ceiling panel 10; the fourth side surface 153 of the body 100 may form the fourth exposed side surface 53 of the ceiling panel 10.

In other embodiments, a coating—such as a paint—may be applied to the second major surface 112 of the body, whereby the coating forms the second exposed major surface 12 of the ceiling panel 10. According to such embodiments, the first major surface 111 of the body 100 may form the second exposed major surface 12 of the ceiling panel 10. According to such embodiments, the side surface 113 of the body 100 may form the side exposed surface 13 of the ceiling panel 10. Specifically, the first side surface 123 of the body 100 may form the first exposed side surface 23 of the ceiling panel 10; the second side surface 133 of the body 100 may form the second exposed side surface 33 of the ceiling panel 10; the third side surface 143 of the body 100 may form the third exposed side surface 43 of the ceiling panel 10; the fourth side surface 153 of the body 100 may form the fourth exposed side surface 53 of the ceiling panel 10.

In other embodiments, the body 100 may form the entirety of the ceiling panel 10, such that no additional scrim, facing layer, or coating is required to be applied to the second major surface 112 of the body 100—resulting in the second major surface 112 of the body 100 forming the second exposed major surface 12 of the ceiling panel. According to such embodiments, the first major surface 111 of the body 100 may form the second exposed major surface 12 of the ceiling panel 10. According to such embodiments, the side surface 113 of the body 100 may form the side exposed surface 13 of the ceiling panel 10. Specifically, the first side surface 123 of the body 100 may form the first exposed side surface 23 of the ceiling panel 10; the second side surface 133 of the body 100 may form the second exposed side surface 33 of the ceiling panel 10; the third side surface 143 of the body 100 may form the third exposed side surface 43 of the ceiling panel 10; the fourth side surface 153 of the body 100 may form the fourth exposed side surface 53 of the ceiling panel 10.

The airlaid process or a carding process that forms the body 100 of the present invention may comprise a first step of depositing fibrous material and any additional component onto a first conveyor surface that moves along a machine direction. The fibrous material and additional component may move along the machine direction into a mixing apparatus—such as an airlaid apparatus or a carding apparatus. In the airlaid process, the fibrous material and any additional component are blended together in the presence of pressurized air to form a blend. In the lapping process, the blending process may be facilitated by two or more textured rollers that churn the blend of fibrous material—optionally with the additional component.

The resulting blend may be deposited onto a second conveyor surface in the form of a continuous web having a first thickness. The continuous web may then be passed along the machine direction between two or more compression rolls, whereby the continuous web is compressed to a second thickness. The second thickness may be substantially equal to the body thickness $t_B$. The resulting compressed web may then be cut to size of the body 100 for both the body length $L_B$ and body width $W_B$. A ratio of the second thickness to the first thickness may range from about 1:2 to about 1:20—including all ratios and sub-ranges there-be-tween.

During manufacture, the thermoplastic nature of the polymer fiber may bond together the fibrous material and additional components. Specifically, the blend may be heated to a temperature above the melt temperature of at least one thermoplastic polymer within the fibrous material. The blend may be heated to a temperature ranging from about 110° C. to about 200° C.—including all temperatures and sub-ranges there-between.

Above the melt temperature, the thermoplastic polymer may at least partially melt and contact adjacent fibrous material and additional components. When the blend is cooled below the melt temperature, the resulting fibrous material and additional components are held together.

The fibrous material may be held above the melting temperature at the time when the continuous web passes through the compression rolls, thereby compressing the web while at least some of the fibrous material is in a melted state. Thus, the continuous web may be compressed from the first thickness to the second thickness while in a melted state and then cool to a solidified state in the second thickness (i.e., the body thickness $t_B$), thereby retaining the second thickness. Once cooled to the solidified state, the continuous web may be cut to size for the body width $W_B$ and body length $L_B$.

The body 100 of the ceiling panel 10 of the present invention may also be formed from at least two separate layers—each layer being formed of the previously discussed formulation—whereby each layer may be coupled together by adhesive or a suitable fastener. According to some embodiments, each of the layers that may make up the multi-layer body 100 have a layer thickness that is equal to about 10% to about 50% of the of the body thickness $t_B$ of the overall body 100—whereby when the separate layers are combined, the multi-layer structure has a thickness equal to the body thickness $t_B$.

Figure 5:
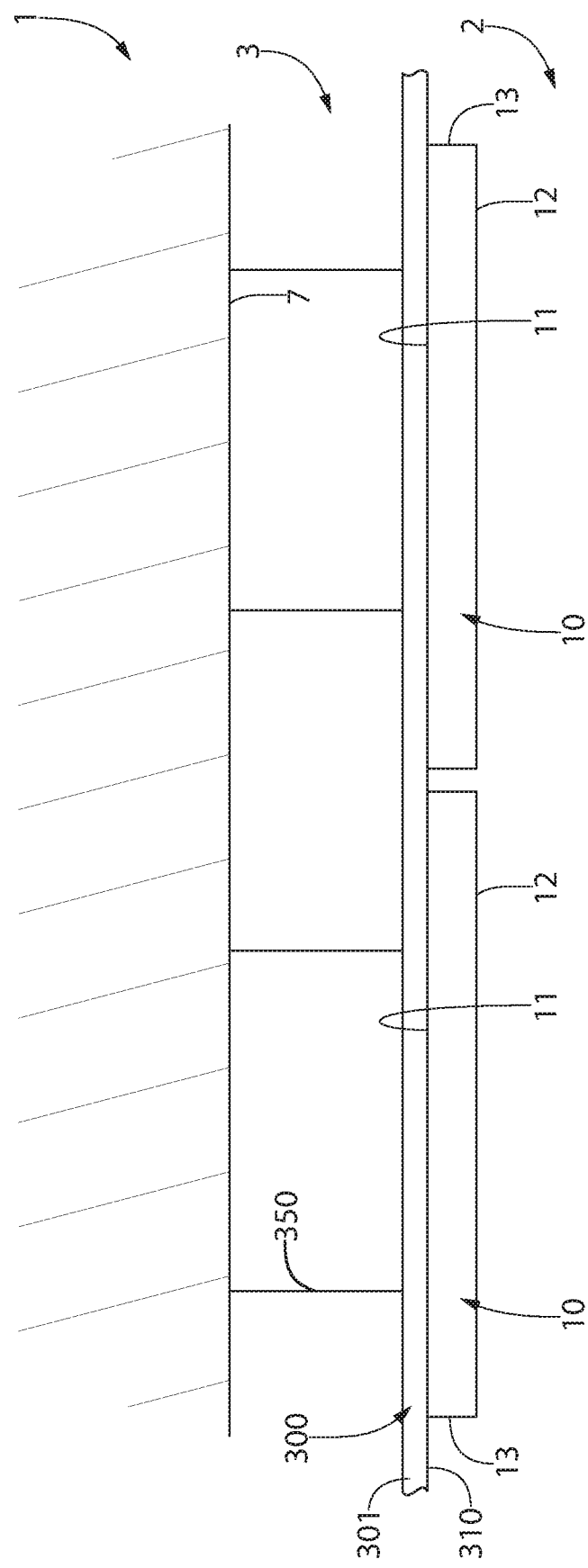
FIG. 5 is side view of the building system of FIG. 4.
Figure 6:
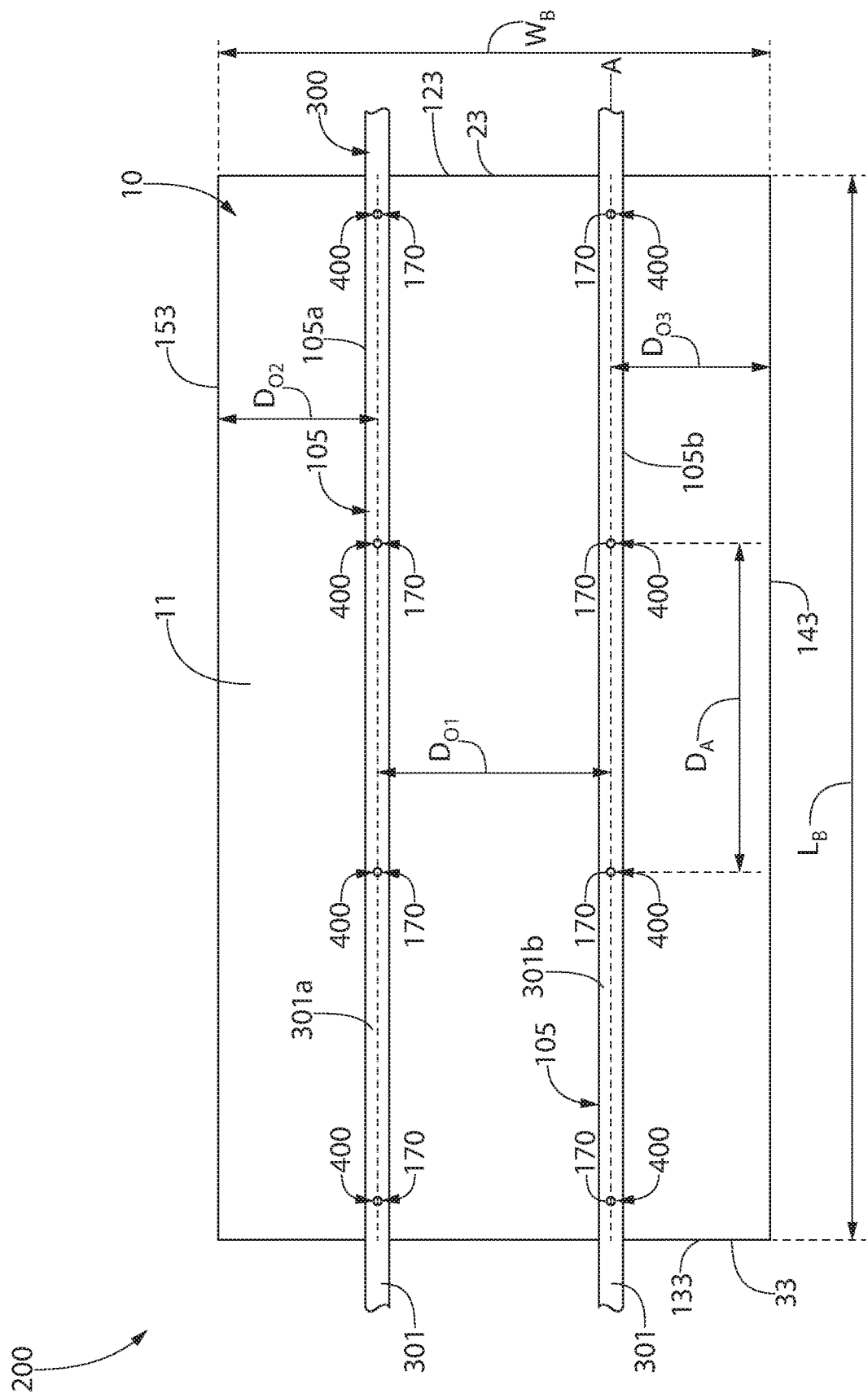
FIG. 6 is a rear view of a building assembly comprising the acoustic building panel of the present invention.

Referring now to FIGS. 4-6, the present invention further includes a ceiling system 1 comprising at least one of the ceiling panels 10. In some embodiments, the ceiling system 1 may comprise a plurality of the ceiling panels 10. The ceiling system 1 may comprise one or more of the building panels 10 installed in an interior space, whereby the interior space comprises a plenary space 3 and an active room environment 2. The plenary space 3 is located below the structural ceiling 7, which is the lower facing surface of the structural separation between floors or a roof of a building—such as a subfloor of an adjacent upper floor, or the roof structure of a building.

The plenary space 3 provides space for mechanical lines within a building (e.g., HVAC, plumbing, etc.). The active space 2 provides room for the building occupants during normal intended use of the building (e.g., in an office building, the active space would be occupied by offices containing computers, lamps, etc.).

In the installed state, the ceiling panels 10 may be supported in the interior space by one or more support elements 300. The support elements 300 may comprise a lowermost support surface 310 configured for attachment to the first exposed major surface 11 of the ceiling panel 10.

In some embodiments, the support elements 300 may comprise an elongated member 301 that extends longitudinally along a longitudinal axis A-A. The elongated member 301 may comprise the lowermost support surface 310 that also extends along the longitudinal axis A-A.

Non-limiting examples of the elongated member 301 include a support strut or an inverted T-bar, whereby the lowermost support surface 310 is the bottom surface of the support strut or the lower face of a bottom flange of the inverted T-bar.

In such embodiments, the elongated member 301 may be coupled to the structural ceiling 7 by one or more connection elements 350. The connection elements 350 may be a support cable or fastener. According to the embodiments where the connection elements 350 is a support cable, the elongated members 301 may be suspended from the structural ceiling 7, thereby forming the ceiling system 1 into a hanging ceiling system 1.

Figure 8:
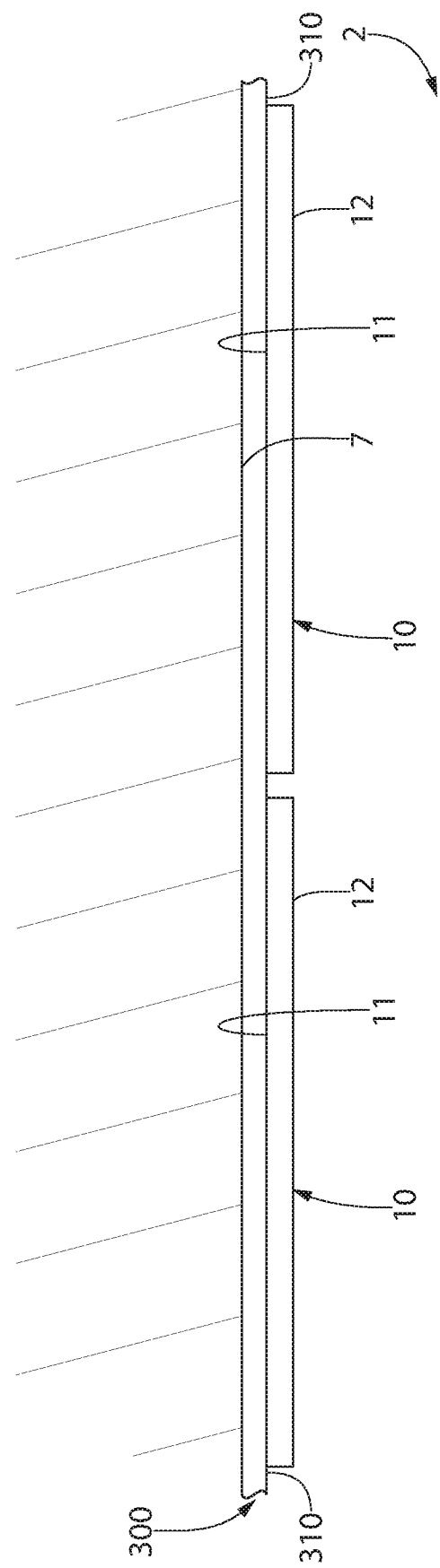
FIG. 8 is a building system according to an alternative embodiment of the present invention.

Referring now to FIG. 8, in other embodiments, the support element 300 may be a pre-existing wall or ceiling surface—such as a dry wall surface—which comprises a support surface 310 formed by the exposed major surface of the wall or ceiling surface. In such embodiments, the ceiling panel 10 may be directly coupled to the preexisting wall such that the first exposed major surface 11 of the building panel 10 contacts the support surface 310.

Referring to FIGS. 4-7, according to the embodiments where the support elements 300 comprise elongated members 301, the ceiling system 1 may comprise a plurality of such elongated members 301 arranged in a parallel array. Specifically, the plurality of elongated members 301 may comprise a first one of the elongated members 301a and a second one of the elongated members 301b, which are arranged parallel to each other—whereby the first exposed major surface 11 of the ceiling panel 10 contacts each of the lowermost support surface 310 of each of the first one of the elongated members 301a and the second one of the elongated members 301b.

The ceiling panel 10 may be coupled to each of the first one of the elongated members 301a and the second one of the elongated members 301b by attachment hardware 400. Non-limiting examples of the attachment hardware 400 include one or more of fasteners, magnets, and/or adhesive.

Together, the at least one ceiling panel 10 and the elongated members 301 coupled together with the attachment hardware 400 may form a ceiling panel assembly 200.

The adhesive attachment hardware 400 may be present at an interface existing between the first exposed major surface 11 of the ceiling panel 10 and the lowermost support surface 310 of the support element 300. The magnet attachment hardware 400 may be present at an interface existing between the first exposed major surface 11 of the ceiling panel 10 and the lowermost support surface 310 of the support element 300. The fastener attachment hardware 400 may extend through the body 100 of the ceiling panel 10 such that it passes from the second major surface 112 through the first major surface 111 into the lowermost support surface 310 of the support element 300. In other embodiments, the fastener attachment hardware 400 may extend into the body 100 of the ceiling panel 10 such that it through the lowermost support surface 310 of the support element 300 and through the first exposed major surface 11 of the ceiling panel 10 but terminates before reaching the second exposed major surface 12 of the ceiling panel 10.

The attachment hardware may be positioned on the ceiling panel 10 at attachment points 170 located on the first exposed major surface 11 of the ceiling panel 10. The attachment points 170 may extend along at least one attachment row 105 that is located on the first exposed major surface 11 of the ceiling panel 10. Each attachment row 105 may extend length-wise from the first side surface 123 to the second side surface 133 of the body 100. Each attachment row 105 may extend along a direction that is substantially parallel to the third and fourth side surfaces 143, 153 of the body 100.

Each of the ceiling panels 10 may comprise a first attachment row 105a and a second attachment row 105b, whereby the first and second attachment rows 105a, 105b are horizontally offset from each other on the first exposed major surface 11 of the ceiling panel 10. The first attachment row 105a and the second attachment row 105b may be offset from each other by a first offset distance $D_{O1}$ that is a non-zero value. The first offset distance $D_{O1}$ may range from about 50 cm to about 70 cm—including all distances and sub-ranges there-between. In a preferred embodiment, the first offset distance $D_{O1}$ may range from about 58 cm to about 64 cm—including all distances and sub-ranges there-between.

The first attachment row 105a may be adjacent to the fourth side surface 153 of the body 100. The first attachment row 105a may be located inset of the fourth side surface 153 by a second offset distance $D_{O2}$ that is a non-zero value. The second offset distance $D_{O2}$ may range from about 15 cm to about 31 cm—including all distances and sub-ranges there-between. In a preferred embodiment, the second offset distance $D_{O2}$ may range from about 20 cm to about 26 cm—including all distances and sub-ranges there-between.

The second attachment row 105b may be adjacent to the third side surface 143 of the body 100. The second attachment row 105b may be located inset of the third side surface 143 by a third offset distance $D_{O3}$ that is a non-zero value. The third offset distance $D_{O3}$ may range from about 15 cm to about 31 cm—including all distances and sub-ranges there-between. In a preferred embodiment, the third offset distance $D_{O3}$ may range from about 20 cm to about 26 cm—including all distances and sub-ranges there-between.

In some embodiments, the first offset distance $D_{O1}$ and the second offset distance $D_{O2}$ are not equal. In some embodiments, the first offset distance $D_{O1}$ and the third offset distance $D_{O3}$ are not equal. In some embodiments, the second offset distance $D_{O2}$ and the third offset distance $D_{O3}$ are equal. In some embodiments, the second offset distance $D_{O2}$ and the third offset distance $D_{O3}$ are not equal.

The attachment points 170 along each of the attachment rows 105 may be separated by an attachment distance $D_A$ that is a non-zero value. The attachment distance $D_A$ may range from about 50 cm to about 70 cm—including all distances and sub-ranges there-between. In a preferred embodiment, the attachment distance $D_A$ may range from about 58 cm to about 64 cm—including all distances and sub-ranges there-between.

According to the embodiments where the attachment hardware 400 is magnets, the ceiling system may comprise three attachment rows per ceiling panel to accommodate for seismic requirements. However, the additional attachment row and corresponding attachment points may not be required for adequate sag resistance.

According to the present invention, a ratio of body length $L_B$ to attachment distance $D_A$ may range from about 1.6:1 to about 4.2:1—including all ratios and sub-ranges there-between. In some embodiments, the ratio of body length $L_B$ to attachment distance $D_A$ may range from about 1.6:1 to about 1.9:1—including all ratios and sub-ranges there-between. In some embodiments, the ratio of body length $L_B$ to attachment distance $D_A$ may range from about 3.7:1 to about 3.8:1—including all ratios and sub-ranges there-between.

According to the present invention, a ratio of body width $W_B$ to the first offset distance $D_{O1}$ may range from about 1.6:1 to about 1.9:1—including all ratios and sub-ranges there-between. In some embodiments, the ratio of body width $W_B$ to the first offset distance $D_{O1}$ may range from about 1.7:1 to about 1.8:1—including all ratios and sub-ranges there-between.

According to the present invention, a ratio of body width $W_B$ to the second offset distance $D_{O2}$ may range from about 4.3:1 to about 5.0:1—including all ratios and sub-ranges there-between. In some embodiments, the ratio of body width $W_B$ to the second offset distance $D_{O2}$ may range from about 4.5:1 to about 4.7:1—including all ratios and sub-ranges there-between.

According to the present invention, a ratio of body width $W_B$ to the third offset distance $D_{O3}$ may range from about 4.3:1 to about 5.0:1—including all ratios and sub-ranges there-between. In some embodiments, the ratio of body width $W_B$ to the third offset distance $D_{O3}$ may range from about 4.5:1 to about 4.7:1—including all ratios and sub-ranges there-between.

Figure 7:
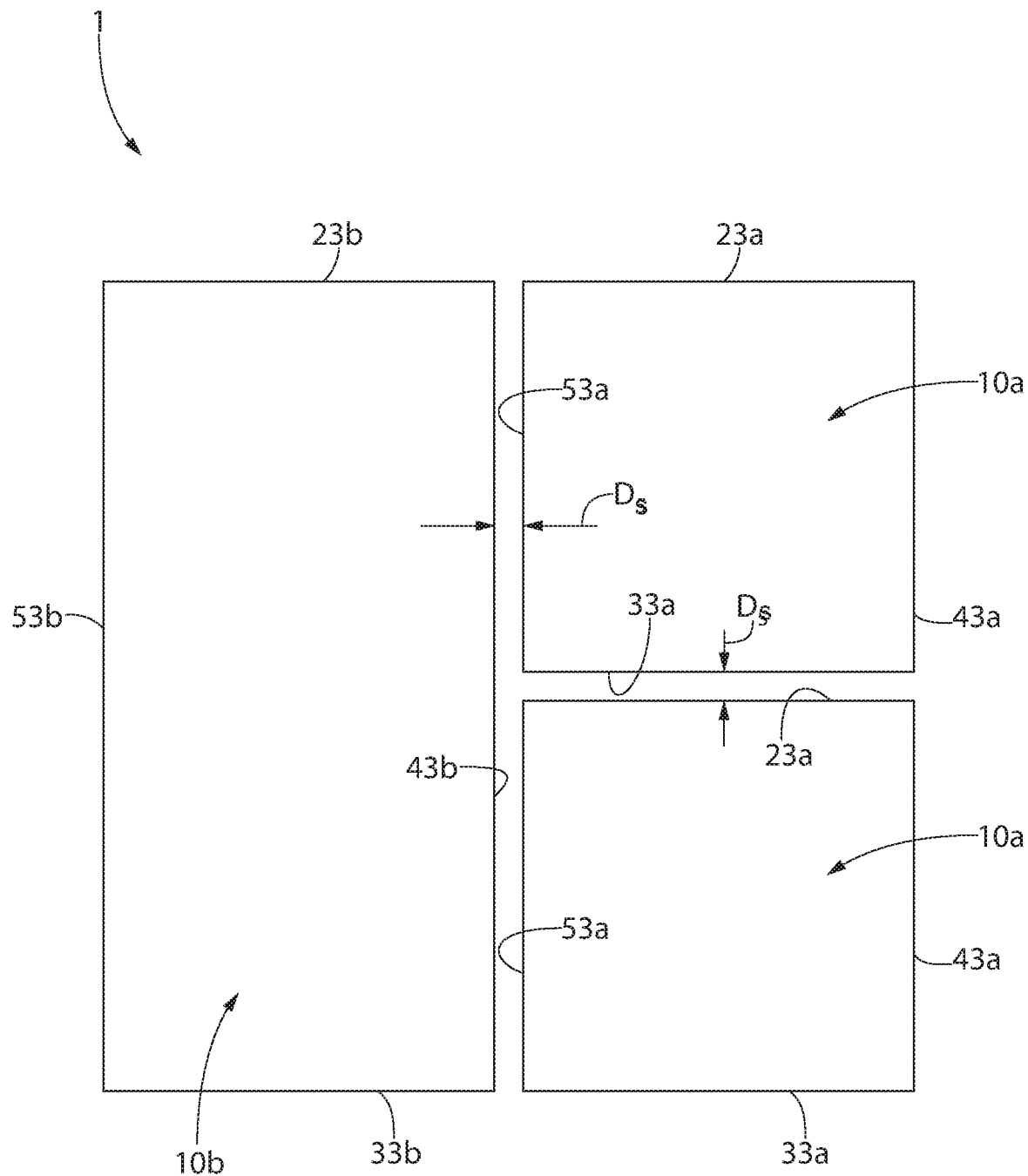
FIG. 7 is a front-facing view of the building system of FIG. 4.

Referring now to FIG. 7, the plurality of ceiling panels 10 may be installed into the ceiling system 1 such that each of the ceiling panels 1 are offset from each other by a separation distance $D_S$ that is a positive, non-zero value. Specifically, a first one of the plurality of ceiling panels 10a may be horizontally offset from a second one of the plurality of ceiling panels 10b by the separation distance $D_S$, which is at least greater than 2.5 cm. The separation distance $D_S$ may range from about 0 cm to about 20 cm—including all distances and sub-ranges there-between. In some embodiments, the separation distance $D_S$ may range from about 12 cm to about 17 cm—including all distances and sub-ranges there-between.

According to the present invention, a ratio of body length $L_B$ to separation distance $D_S$ may range from about 5:1 to about 18:1—including all ratios and sub-ranges there-between. In some embodiments, the ratio of body length $L_B$ to separation distance $D_S$ may range from about 5:1 to about 9:1—including all ratios and sub-ranges there-between. In some embodiments, the ratio of body length $L_B$ to separation distance $D_S$ may range from about 13:1 to about 17:1—including all ratios and sub-ranges there-between.

Referring back to FIG. 6, each of the ceiling panels 10 may be coupled to the first one of the elongated members 301a and the second one of the elongated members 301b by the attachment hardware 400. Specifically, the ceiling panel 10 may be coupled to support elements 300 such that the first exposed major surface 11 of the ceiling panel 10 contacts a lowermost support surface 310a of a first one of the elongated members 301a and a lowermost support surface 310b of a second one of the elongated members 301b.

Referring now to FIGS. 4 and 5, in the installed state, the first exposed major surface 11 of the building panel 10 may face the plenary space 3 and the second exposed major surface 12 of the building panel 10 may face the active room environment 2. The building panels 10, by virtue of the low density body 100, may exhibit both superior acoustical properties as well as resistance to flame and smoke spread as each body 100 contains less combustible material. Furthermore, it has been surprisingly discovered that, even though the body 100 of the present invention includes less material relative to the relative higher density counterparts, the lower density body 100 exhibits super resistance to sag. The result is a ceiling panel assembly 200 and corresponding ceiling system 1 that may be assembled using less attachment hardware 400 and support elements 300.

Although not pictured, according to the embodiments there the building systems form wall surfaces, in the installed state, the first exposed major surface 11 of the building panel 10 may face a wall support surface (such as a stud or pre-existing dry-wall, wall surface) and the second exposed major surface 12 of the building panel 10 may face the active room environment 2—whereby the first and second major exposed surfaces are in a vertical or semi-vertical orientation relative to the active room environment 2.

EXAMPLES

First Experiment—Flame and Smoke Resistance

A first experiment was conducted to test the impact of flame spread and smoke developed in the building panels of the present invention. A number of building panels were prepared having a body formed of polyester single component fiber, polyester bicomponent fiber, finishing oil, organic pigments, and organo phosphate fire retardant. Each body had the same formulation except for the type of colorant added. Each of the panels were processed by an air laid process such that the resulting boards exhibited a bulk density between about 86.5 kg/m³ to about 120.1 kg/m³. Each body had a thickness of about 25 mm. The details of each board are set forth below in Table 1.

TABLE 1

|  | Density | Color | Flame Spread | Smoke Developed |
|---|---|---|---|---|
| Ex. 1 | 86.5 kg/m³ | White | 0 | 300 |
| Ex. 2 | 96.1 kg/m³ | White | 0 | — |
| Ex. 3 | 120.1 kg/m³ | White | 0 | 350 |
| Ex. 4 | 86.5 kg/m³ | Black | 0 | 350 |
| Ex. 5 | 96.1 kg/m³ | Black | 0 | 450 |
| Ex. 6 | 120.1 kg/m³ | Black | 15 | 600 |
| Ex. 7 | 86.5 kg/m³ | Light Grey | 0 | 400 |
| Ex. 8 | 96.1 kg/m³ | Light Grey | 0 | — |
| Ex. 9 | 120.1 kg/m³ | Light Grey | 5 | 600 |
| Ex. 10 | 86.5 kg/m³ | Dark Grey | 0 | 350 |
| Ex. 11 | 96.1 kg/m³ | Dark Grey | 0 | — |
| Ex. 12 | 120.1 kg/m³ | Dark Grey | 20 | 500 |
| Ex. 13 | 86.5 kg/m³ | Beige | 0 | 350 |
| Ex. 14 | 96.1 kg/m³ | Beige | 0 | 500 |
| Ex. 15 | 120.1 kg/m³ | Beige | 0 | 600 |

As demonstrated by Table 1, for each color, the building panels comprising a body having a density less than 120.1 kg/m³—specifically, 96.1 kg/m³ or less—results in superior resistance to flame spread and smoke developed.

Second Experiment—Sag Resistance

A second experiment was conducted to test the sag-resistance of the building panels of the present invention. Before subjecting the panels of the first experiment to the flame test, the panels of Examples 1-5 and 10-15 were subjected to a droop measure, whereby a first portion of each panel was set on a table top and the remaining portion of the panel extended from the edge of the table top, thereby being unsupported. Each panel drooped downward under the effect of gravity a measurable distance—which was recorded as a droop distance. The results of the droop test are set forth below in Table 2.

TABLE 2

|  | Density | Gravitational Droop (cm) | Change (cm) |
|---|---|---|---|
| Ex. 1 | 86.5 kg/m³ | 66.8 | — |
| Ex. 3 | 120.1 kg/m³ | 71.1 | +4.3 |
| Ex. 4 | 86.5 kg/m³ | 64.0 | — |
| Ex. 6 | 120.1 kg/m³ | 68.8 | +4.8 |
| Ex. 7 | 86.5 kg/m³ | 66.0 | — |
| Ex. 9 | 120.1 kg/m³ | 70.6 | +4.6 |
| Ex. 10 | 86.5 kg/m³ | 63.8 | — |
| Ex. 12 | 120.1 kg/m³ | 64.3 | +0.5 |
| Ex. 13 | 86.5 kg/m³ | 67.8 | — |
| Ex. 15 | 120.1 kg/m³ | 68.1 | +0.3 |

As demonstrated by Table 2, it was surprisingly discovered that building panels having improved sag-resistance can be formed using a body with a decreased bulk density—i.e., less than 120.1 kg/m³. The surprising improvement in droop performance for lower density panels is that fewer attachment points, which may be spaced apart from each other by a greater distance, may be used to couple the ceiling panel to a supporting element—thereby reducing cost and time required to fully install the building panel.

What is claimed is:

1. An acoustic building panel comprising:
a body comprising a fibrous material and having a first major surface opposite a second major surface and a side surface extending there-between, the side surface comprising a first side surface, a second side surface opposite the first side surface, a third side surface, and a fourth side surface opposite the third side surface, the first and second major surfaces intersecting the first, second, third, and fourth side surfaces, the fibrous material comprising polyester fiber in an amount of at least 70 wt. % based on the total weight of the fibrous material;
wherein the body has a bulk density as measured between the first major surface, the second major surface, and the first, second, third, and fourth side surfaces, the bulk density ranging from about 76.9 kg/m³ to about 96.1 kg/m³.

2. The acoustic building panel according to claim 1, wherein the body has a porosity ranging from about 90% to about 97%.

3. The acoustic building panel according to claim 1, wherein the polyester fiber has an average fiber length ranging from about 25 mm to about 100 mm, wherein the polyester fiber has an average fiber diameter ranging from about 4 denier to about 15 denier.

4. The acoustic building panel according to claim 1, wherein the bulk density is substantially uniform within the body.

5. The acoustic building panel according to claim 1, wherein the polyester fiber comprises single component polyester fiber and bicomponent polyester fiber.

6. The acoustic building panel according to claim 1, wherein the polyester fiber is present in an amount of at least 85 wt. % based on the total weight of the fibrous material; and wherein the fibrous material is substantially free of inorganic fiber.

7. The acoustic building panel according to claim 1, wherein the body further comprises at least one additional component selected from the groups consisting of fire retardant, finishing oil, and pigment, and wherein the fibrous material and the additional component form 100 wt. % of the body.

8. The acoustic building panel according to claim 1, wherein the body exhibits an NRC value ranging from about 0.7 to about 1.0.

9. An acoustic building panel comprising
a body formed of a fibrous material comprising:
  a first major surface;
  a second major surface opposite the first major surface;
  a side surface extending between the first major surface and the second major surface, the side surface further comprising:
    a first side surface;
    a second side surface opposite the first side surface;
    a third side surface; and
    a fourth side surface opposite the third side surface;
    the first and second side surfaces intersecting the third and fourth side surfaces;
  wherein the body has a thickness as measured between the first and second major surfaces, a length as measured between the first and second side surface, and a width as measured between the third and fourth side surfaces wherein a first ratio of length to thickness is at least 40:1 and a second ratio of width to thickness is at least 40:1;
  wherein the body has a bulk density as measured between the first major surface, the second major surface, and the side surface, the bulk density ranging from about 76.9 kg/m$^3$ to about 96.1 kg/m$^3$.

10. The acoustic building panel according to claim 9, wherein the body comprises:
  a plurality of attachment rows, each row comprising a plurality of attachment points,
  wherein the attachment rows extend along the length of the body and the plurality of attachment points are spaced apart from each other by an attachment distance, the ratio of the length of the body to the attachment distance ranging from about 3.5:1 to about 4.5:1.

11. The acoustic building panel according to claim 9, wherein the fibrous material comprises polyester fiber.

12. The acoustic building panel according to claim 9, wherein the body has a porosity ranging from about 90% to about 97%.

13. A ceiling system comprising:
  a support element having a downward facing support surface;
  at least one of the acoustic building panels according to claim 1;
  wherein the acoustic building panels are coupled to the support element such that the first major surface of the body contacts the downward facing support surface.

14. The ceiling system according to claim 13, wherein the support element is a wall surface.

15. The ceiling system according to claim 13, comprising a first one of the acoustic building panel adjacent to a second one of the acoustic building panel, the side surface of the first one of the acoustic building panel horizontally offset from the adjacent most side surface of the second one of the acoustic building panel by an offset distance, the offset distance being greater than 1 inch.

16. The ceiling system according to claim 15, wherein the ratio of the length of each of the first and second ones of the acoustic building panel to the offset distance ranges from about 6:1 to about 16:1.

17. A method of forming an acoustic building panel, the method comprising:
  a) creating a blend comprising a fibrous material and mixing the blend with pressurized air in a mixing apparatus, the blend being transported along a machine direction as it is mixed;
  b) depositing the blend onto a conveyor to form a continuous web having a first thickness;
  c) passing the continuous web between a compression element along the machine direction, the compression element compressing the continuous web to a second thickness that is less than the first thickness;
  d) cutting the continuous web to form a body of an acoustic building panel;
  wherein the fibrous material of the blend comprises at least 70 wt. % of polyester fiber based on the total weight of the fibrous material, and wherein the body has a bulk density ranging from about 76.9 kg/m$^3$ to about 96.1 kg/m$^3$.

18. The method according to claim 17, wherein the compression element is heated to a temperature ranging from about 110° C. to about 200° C.

19. The method according to claim 17, wherein a ratio of the second thickness to the first thickness ranges from about 1:2 to about 1:20.

20. The method according to claim 17, wherein the body has a length and a width; wherein the length ranges from about 75 cm to about 250 cm, and wherein the width ranges from about 75 cm to about 130 cm.

* * * * *